(12) United States Patent
Greiner

(10) Patent No.: US 11,593,553 B1
(45) Date of Patent: Feb. 28, 2023

(54) ONLINE PURCHASE AUTOFILL PLUG-IN

(71) Applicant: American Express Travel Related Services Company, Inc., New York, NY (US)

(72) Inventor: Hans-Jurgen Greiner, Desert Hills, AZ (US)

(73) Assignee: AMERICAN EXPRESS TRAVEL RELATED SERVICES COMPANY, INC., New York, NY (US)

(*) Notice: Subject to any disclaimer, the term of this patent is extended or adjusted under 35 U.S.C. 154(b) by 154 days.

(21) Appl. No.: 17/220,433

(22) Filed: Apr. 1, 2021

Related U.S. Application Data

(63) Continuation of application No. 16/446,133, filed on Jun. 19, 2019, now Pat. No. 10,990,752, which is a continuation of application No. 14/990,232, filed on Jan. 7, 2016, now Pat. No. 10,360,296.

(51) Int. Cl.
| | | |
|---|---|---|
| *G06F 21/00* | (2013.01) | |
| *G06F 40/174* | (2020.01) | |
| *G06Q 20/12* | (2012.01) | |
| *G06F 3/0481* | (2022.01) | |
| *G06N 20/00* | (2019.01) | |
| *G06N 7/02* | (2006.01) | |
| *G06N 5/048* | (2023.01) | |

(52) U.S. Cl.
CPC .......... *G06F 40/174* (2020.01); *G06F 3/0481* (2013.01); *G06N 5/048* (2013.01); *G06N 7/02* (2013.01); *G06N 20/00* (2019.01); *G06Q 20/12* (2013.01)

(58) Field of Classification Search
CPC ........ G06F 21/105; G06F 21/33; G06F 21/44; G06F 2211/008; H04L 9/0877; H04L 9/321; H04L 9/3268; H04L 63/0823; H04L 63/0876
See application file for complete search history.

(56) References Cited

U.S. PATENT DOCUMENTS

| | | |
|---|---|---|
| 6,192,380 B1 | 2/2001 | Light et al. |
| 7,222,158 B2 | 5/2007 | Wexelblat |
| 7,437,312 B2 | 10/2008 | Bhatia et al. |
| 8,468,090 B2 | 6/2013 | Lesandro et al. |
| 8,793,806 B1 | 7/2014 | Truong et al. |
| 9,098,481 B2 | 8/2015 | Gwozdz et al. |
| 9,251,538 B1* | 2/2016 | Shakkarwar ............ H04L 67/02 |

(Continued)

OTHER PUBLICATIONS

Shaohua Wang, et al., An Intelligent Framework for Auto-filling Web Forms from Different Web Applications, 2013 IEEE Ninth World Congress on Services, Jun. 28-Jul. 3, 2013, pp. 175-179.

(Continued)

*Primary Examiner* — Jeffery L Williams
(74) *Attorney, Agent, or Firm* — Thomas Horstemeyer, LLP

(57) ABSTRACT

Systems and methods of improving the operation of a transaction network and transaction network devices are disclosed. An online purchase autofill plugin includes various modules and engines. The fields of online forms may be identified and the fields of online forms may be automatically filled. The user experience may be improved, and data security enhanced so that the transaction network more properly functions according to approved parameters, such as protecting the integrity of sensitive data.

20 Claims, 6 Drawing Sheets

(56) References Cited

U.S. PATENT DOCUMENTS

| | | | |
|---|---|---|---|
| 9,747,598 B2* | 8/2017 | Mogollon | G06Q 30/06 |
| 9,760,871 B1 | 9/2017 | Pourfallah et al. | |
| 10,096,033 B2 | 10/2018 | Heath | |
| 10,255,597 B2* | 4/2019 | Shakkarwar | G06Q 20/10 |
| 10,373,138 B2* | 8/2019 | Hammad | H04L 9/3234 |
| 2005/0268107 A1 | 12/2005 | Harris et al. | |
| 2006/0132448 A1 | 6/2006 | Irons | |
| 2006/0179404 A1* | 8/2006 | Yolleck | G06F 40/174 |
| | | | 715/272 |
| 2009/0313337 A1 | 12/2009 | Jin et al. | |
| 2012/0011017 A1 | 5/2012 | Wootton et al. | |
| 2012/0110174 A1 | 5/2012 | Wootton et al. | |
| 2012/0151380 A1 | 6/2012 | Bishop | |
| 2013/0304637 A1* | 11/2013 | McCabe | G06Q 40/02 |
| | | | 705/39 |
| 2013/0346314 A1 | 12/2013 | Mogollon et al. | |
| 2016/0321653 A1* | 11/2016 | Jacobs | G06Q 20/3224 |
| 2016/0371678 A1* | 12/2016 | Shakkawar | G06Q 20/10 |
| 2017/0126653 A1 | 5/2017 | Lupien et al. | |
| 2017/0195286 A1 | 7/2017 | Stahura et al. | |
| 2017/0201779 A1 | 7/2017 | Publicover et al. | |
| 2018/0005238 A1* | 1/2018 | Hammad | G06Q 20/425 |
| 2019/0303432 A1* | 10/2019 | Greiner | G06N 5/048 |
| 2019/0325445 A1* | 10/2019 | Anderson | G06Q 20/409 |
| 2020/0053111 A1 | 2/2020 | Jakobsson | |
| 2021/0073787 A1* | 3/2021 | Hammad | G06Q 20/385 |
| 2021/0304184 A1* | 9/2021 | Jacobs | G06Q 20/367 |
| 2022/0058617 A1* | 2/2022 | Tibrewala | G06Q 10/10 |

OTHER PUBLICATIONS

USPTO; Non-Final Office Action dated Jul. 13, 2018 in U.S. Appl. No. 14/990,232.

USPTO; Final Office Action dated Nov. 14, 2018 in U.S. Appl. No. 14/990,232.

USPTO; Advisory Action dated Feb. 26, 2019 in U.S. Appl. No. 14/990,232.

USPTO; Notice of Allowance dated Apr. 3, 2018 in U.S. Appl. No. 14/990,232.

"Message Passing", Chrome Developer, https://developer.chrome.com/extensions/messaging, Sep. 2014 (Year: 2014).

* cited by examiner

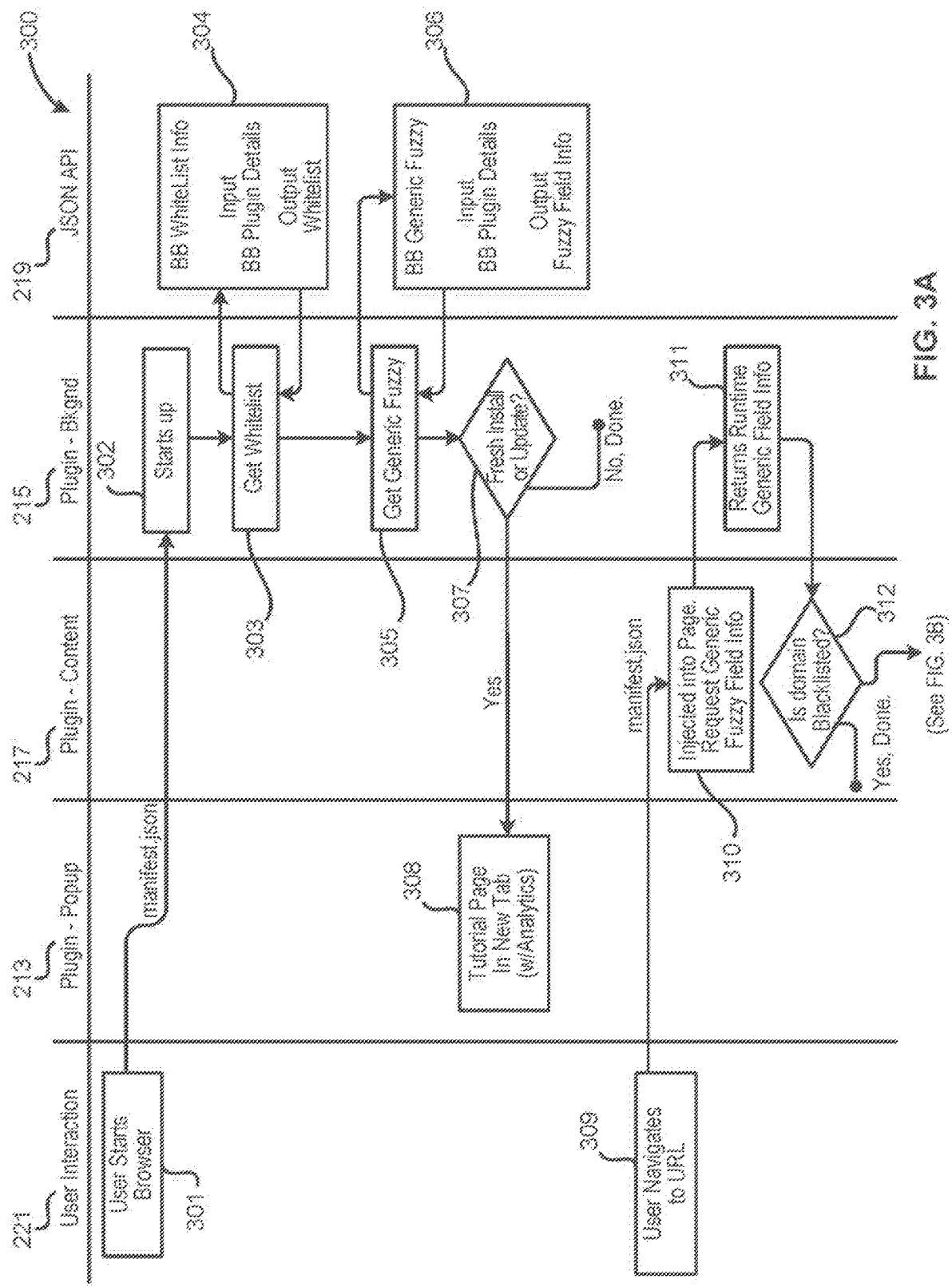

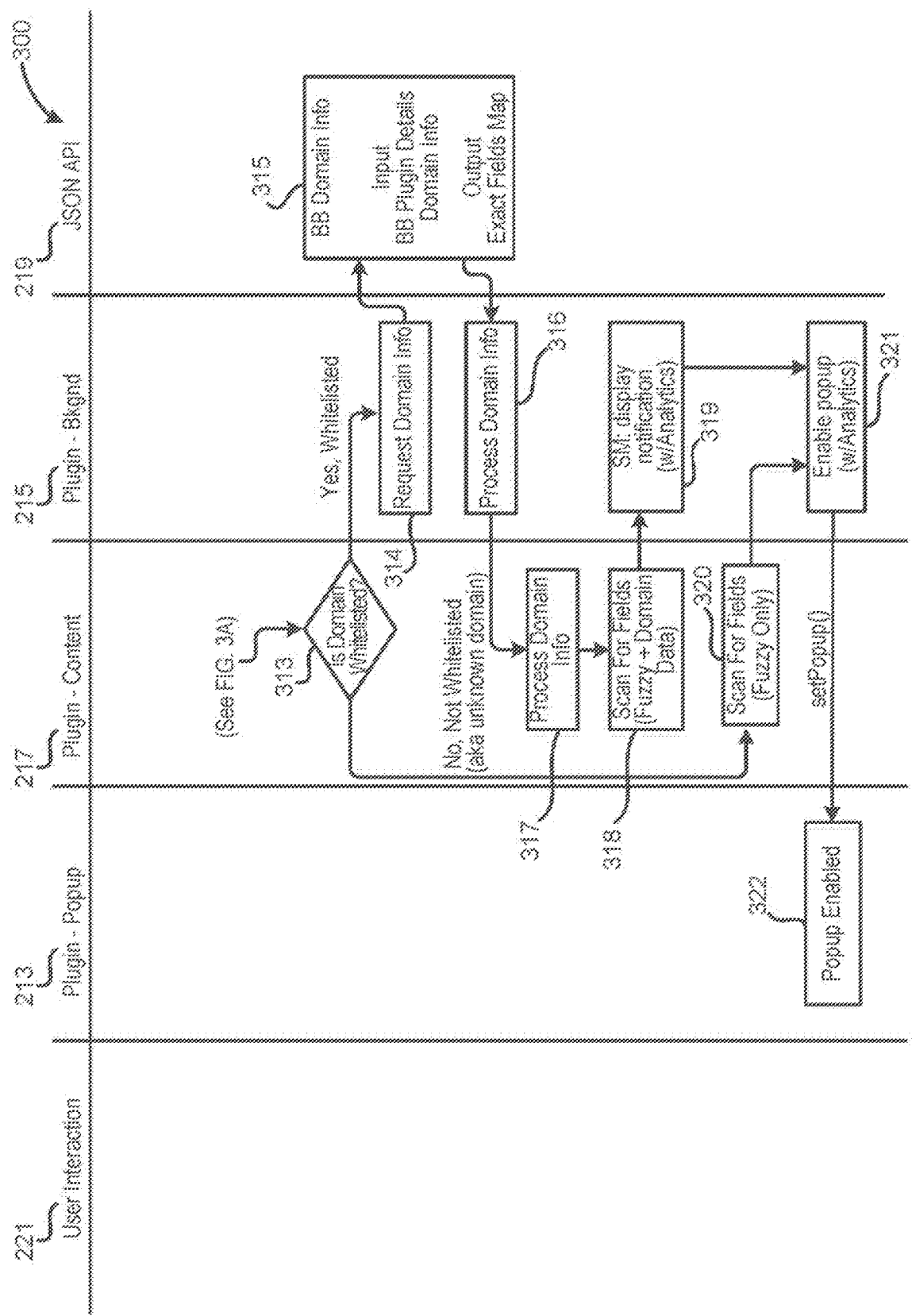

ONLINE PURCHASE AUTOFILL PLUG-IN

CROSS REFERENCE TO RELATED APPLICATIONS

This application is a continuation of, claims priority to and the benefit of, U.S. Ser. No. 16/446,133, filed Jun. 19, 2019, and entitled "ONLINE PURCHASE AUTOFILL PLUG-IN," which is a continuation of U.S. Ser. No. 14/990,232, filed Jan. 7, 2016, and entitled "SYSTEM AND METHOD FOR ONLINE PURCHASE AUTOFILL," both of which are incorporated by reference herein in its entirety for all purposes.

FIELD

The present disclosure relates to data analytics for transaction data.

BACKGROUND

An increasing number of financial transactions occur on the internet. Many consumers desire to use transaction accounts to complete these transactions. However, the process of entering all the details of the purchaser, address, transaction account etc., into a transaction processing front-end interface at the time of each purchase can become time consuming and discourage the consumer from completing the transaction. For instance, form field entry is often responsible for a significant percentage of abandoned transaction shopping carts during online commerce, wherein the transactions are abandoned prior to completion of the sale. In addition to retailers, transaction account issuers have an interest in making the transaction process as quick and easy as possible. Moreover, transaction account issuers have an interest in improved security and improved delivery of targeted advertisements, wherein the transaction processing is secured, and the utilization of transaction data and related data analytics is optimized.

SUMMARY

A method of online purchase autofilling may include transmitting a message to a background engine directing the background engine to retrieve a whitelist. The message may be transmitted by a user interaction engine of an online purchase autofilling plug-in, wherein the plug-in is configured to operate in a browser in association with a browser window. The method may include receiving, from a JSON API engine and by the background engine, the whitelist from a transaction account issuer via a network; retrieving, by the background engine, a fuzzy logic, wherein the background engine communicates with the JSON API engine to retrieve the fuzzy logic from the transaction account issuer via the network; and injecting, by a content engine, a message receiver into an online form in the browser window of the browser. The method may also include returning, by the background engine, information regarding fields present in the online form to the content engine in response to the message receiver, wherein the content engine confirms a blacklist status of a domain; determining, by the content engine, a whitelist status of the domain in the whitelist in response to the blacklist status being negative; and scanning, by the content engine and in response to the whitelist status being negative, the online form for fields according to the fuzzy logic. In various embodiments, the method of online purchase autofilling also includes directing, by the content engine, the background engine and a pop-up engine to enable a pop-up window.

In various embodiments, the method of online purchase autofilling further includes receiving, by the user interaction engine, a user click; determining, by the background engine, that a user session exists for a user in response to the user click; displaying, by the pop-up engine, a login form in response to the user session existing; and validating, by the pop-up engine, a user name and a user password received via the login form. The method may also include directing, by the pop-up engine, the JSON API engine to interoperate with the transaction account issuer via the network to determine that the user is a transaction account holder; issuing, by the pop-up engine, an instrument service call to the JSON API engine directing the JSON API engine to launch an instrument service configured to receive data from the online purchase autofilling plug-in and configured to receive a responsive display data from the transaction account issuer; and displaying, by the pop-up engine, the responsive display data.

In various embodiments, the responsive display data includes a list of transaction accounts and a stored member information. The method may also include receiving from the user, by the user interaction engine, a selection of a transaction account from among the list of transaction accounts. The method may contemplate directing, by the pop-up engine, the background engine to fill the online form with the stored member information, and directing, by the background engine, the content engine to populate the stored member information into the online form displayed within the browser window of the browser. Moreover, the method may include transmitting, by the background engine, a report to the JSON API engine, wherein the report indicates whether the populating was successful. Additionally, the method may include requesting by the background engine that the pop-up engine close the pop-up window. The whitelist may include a list of domains approved for online purchase autofilling. In various embodiments, the online purchase autofilling plug-in is configured to receive, from a transaction account issuer, stored data representative of a nature and arrangement of fields of the online form of the domain.

In various embodiments, the fuzzy logic includes a series of rules, wherein the online purchase autofilling plug-in identifies a plurality of fields and determines a nature and an arrangement of fields of the online form of a domain in the browser. The method may further include determining, by the background engine, that the fuzzy logic includes a new update. Furthermore, a pop-up engine may display a tutorial page for a user to review in response to the fuzzy logic including the new update. Moreover, the online form may be associated with a URL in the browser window of the browser.

An online purchase autofilling plug-in may be configured to operate in a browser in association with a browser window, and may include a pop-up engine configured to launch a pop-up window within the browser wherein a user may transmit and receive data, a user interaction engine configured to format the data for human readability and transmit and receive data formatted for human readability to the user via the pop-up window, a content engine configured to assemble data for display in the pop-up window, a JSON API engine configured to receive responsive display data from a transaction account issuer, and a background engine configured to autofill an online form within the browser window and including fields with the responsive display data.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

FIGS. 3A-3D illustrate an exemplary method of online purchase autofilling, in accordance with various embodiments.

DETAILED DESCRIPTION

Figure 1:
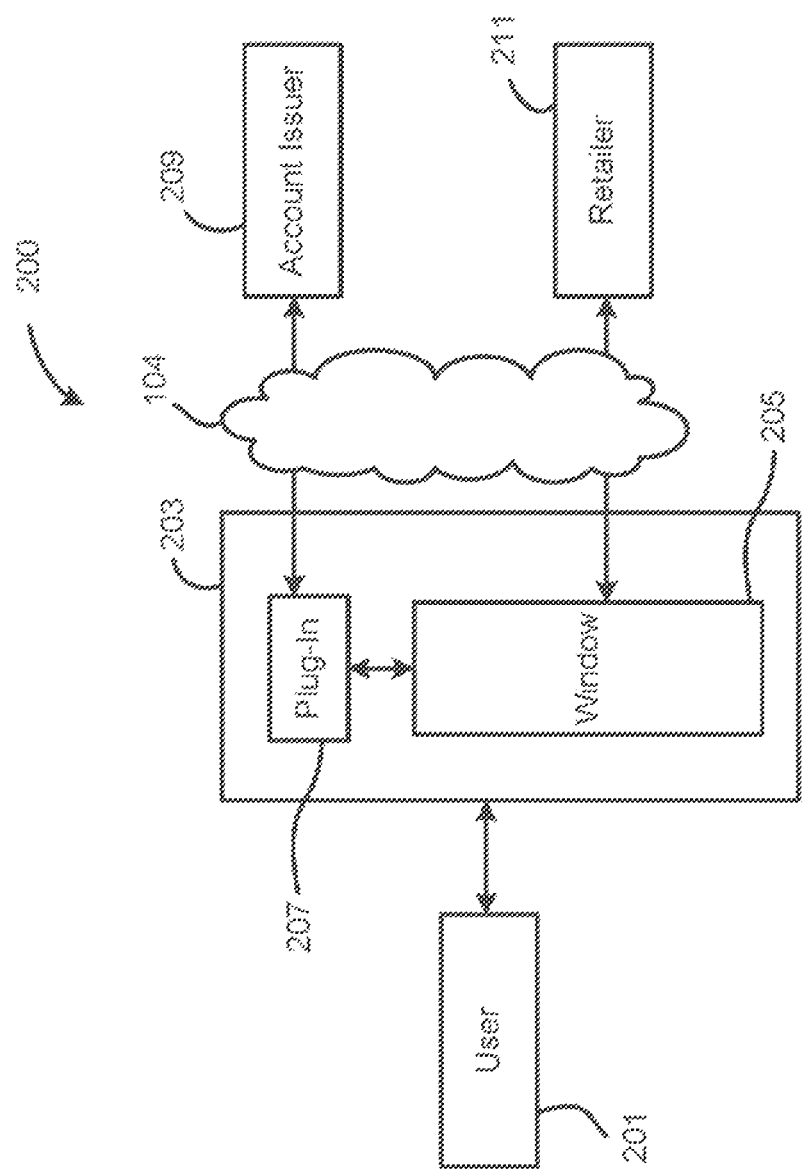
FIG. 1 illustrates an exemplary system for online purchase autofilling, in accordance with various embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptography systems.

In various embodiments, aspects of the system may interact with, store, and/or processes big data sets. As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, transaction network internal data, third party data, credit reporting bureau data, or from other suitable sources. Big data sets may be compiled without descriptive metadata such as column types, counts, percentiles, or other interpretive-aid data points.

In various embodiments, data of the big data set may comprise a collection of data including and/or originating from account holder information, transaction information, account information, record of sales, account history, customer history, sensor data, machine log data, data storage system, public web data, and/or social media. Data may be collected from multiple sources and amalgamated into a big data structure such as a file, for example. In that regard, the data may be used as an input to generate metadata describing the big data structure itself, as well as the data stored in the structure.

The transaction account issuer may have stored member information, such as transaction account numbers, account holder name, account holder address, account holder personally identifying information, and/or the like. As such, in various embodiments, the transaction account issuer has, retained in one or more database, various information that typically would be manually entered by a account holder into an online form in order to complete a transaction. Moreover, the transaction account issuer may have access to third party data that is associated with a transaction account holder, such as credit reporting agency, social media, and other data. By providing a browser plug-in to the user's internet browser, the transaction account issuer may utilize this stored member information (and/or third party data) to autofill the various fields of the online form. Moreover, in various embodiments, the browser plug-in may include machine learning mechanisms, such as a Levenshtein algorithm for implementing a fuzzy logic approach, wherein the various fields of the online form may be identified, and the proper information requested to be filled into each such field first identified, and then filled into that form. In this manner, the browser plug-in may adapt in response to different online forms and in response to different stored member information and/or third party data.

Moreover, the browser plug-in further implements tokenization, wherein the transaction account number associated with the transaction account and/or transaction account of the transaction account holder may be better secured, such as by preventing it from being transmitted across a network. For instance, because the browser plug-in may be provided by the transaction account issuer, the transaction account issuer may identify and validate the identity of the account holder and may complete a transaction using a transaction account issued by the transaction account issuer, without providing sensitive information, such as a transaction account number, or a transaction account number to a third party (for instance, a retailer, or a third party payment processor, or a third party payment processing network) or transmitting it across the potentially unsecured network connecting the device running the browser to the server of the transaction counterparty. Furthermore, the browser plug-in may facilitate the delivery of targeted offers for items to account holders without releasing account holder information to third parties and/or to the transaction counterparty.

The browser plug-in further implements use of a dynamic card security code (CSC), wherein the risk of a compromised CSC may be mitigated through frequent changing of the CSC code (e.g., "dynamic" CSC).

Moreover, in various embodiments, online forms may be configured to detect whether the fields are filled by typing, or other means, such as by data stored in web browsers. The online form may be configured to reject data not entered by typing. Thus, in various embodiments, the browser plug-in further injects a message receiver into the online form, wherein the message receiver listens for data to be autofilled into the online form to be posted by the browser plug-in and may propagate the data to the online form in such a manner as to emulate the typing of keystrokes, so that the online form may function properly.

Still furthermore, the browser plug-in permits the account holder to easily and quickly switch among different transaction accounts and to persist the instrument for many uses.

With reference to FIG. 1, an online purchase autofilling system 200 may comprise a plug-in 207 that operates in a browser 203 in association with a browser window 205. A user 201 may use the browser 203 to access an online form, such as may be provided by a retailer 211 via a network 104. The user 201 may enter data into fields of the online form in order to interact with the retailer 211, such as to complete a transaction with the retailer 211. The plug-in 207 may operate within the browser 203, interacting with the browser window 205, and may in various embodiments assist the user 201 by entering data into fields of the online form on the user's behalf. The plug-in 207 may be in electronic communication with a transaction account issuer 209 via a network 104, wherein the data for entering into the fields is obtained by the plug-in 207 from the transaction account issuer 209 and then entered into the fields of the online form operating in the browser window 205.

Figure 2:
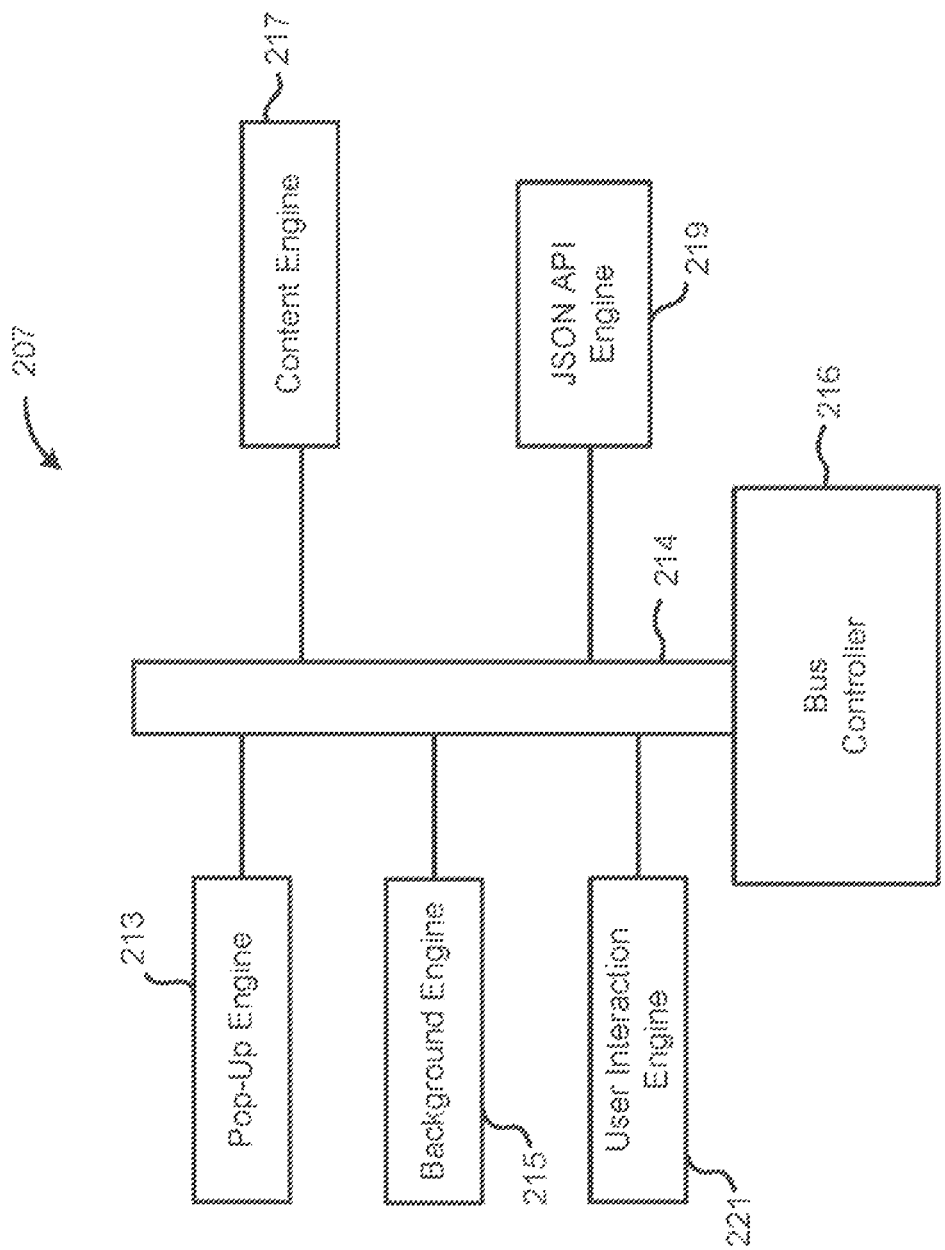
FIG. 2 illustrates an online purchase autofilling plug-in of a system according to FIG. 1, in accordance with various embodiments.
Figure 3C:
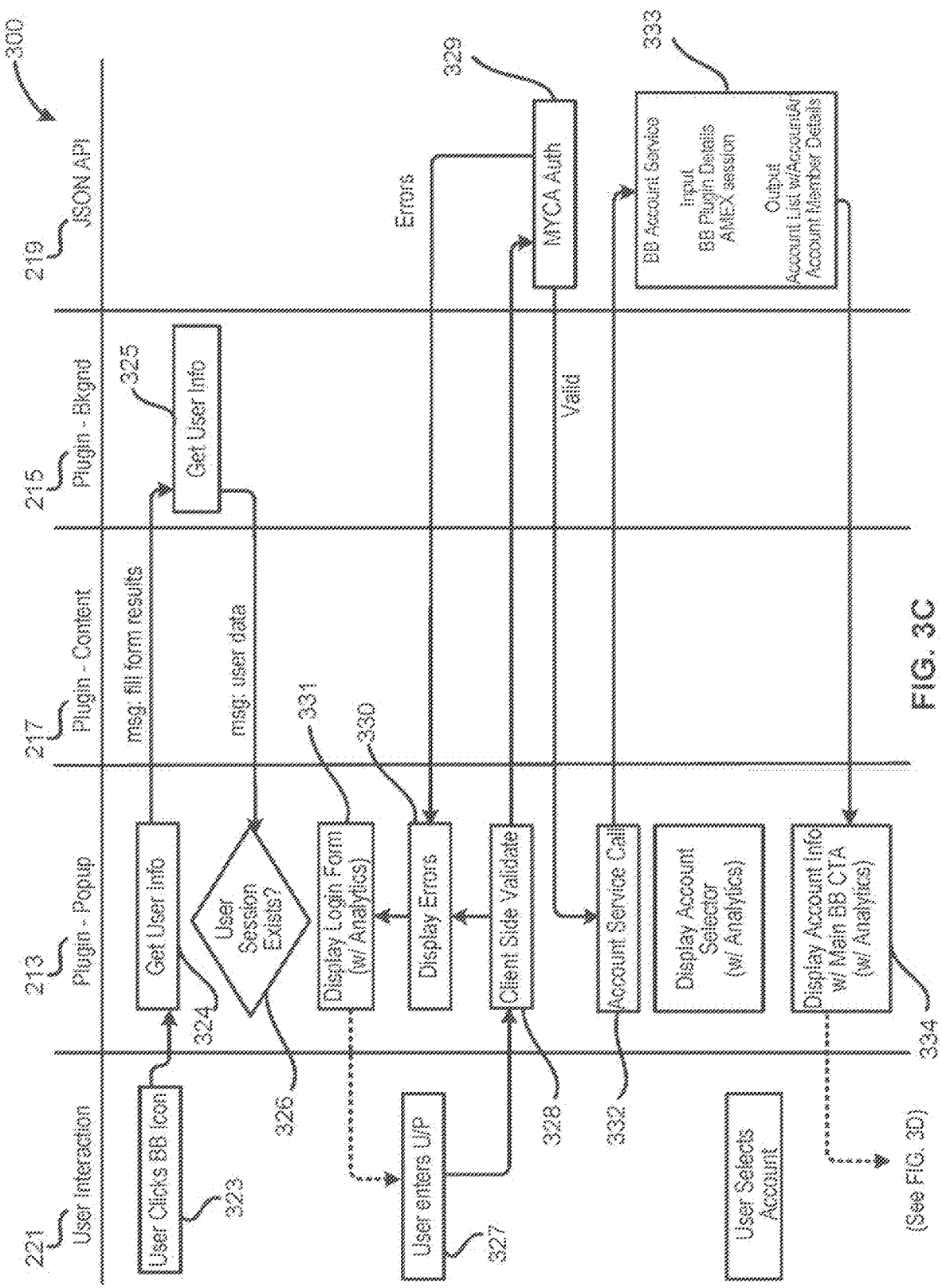
Figure 3D:
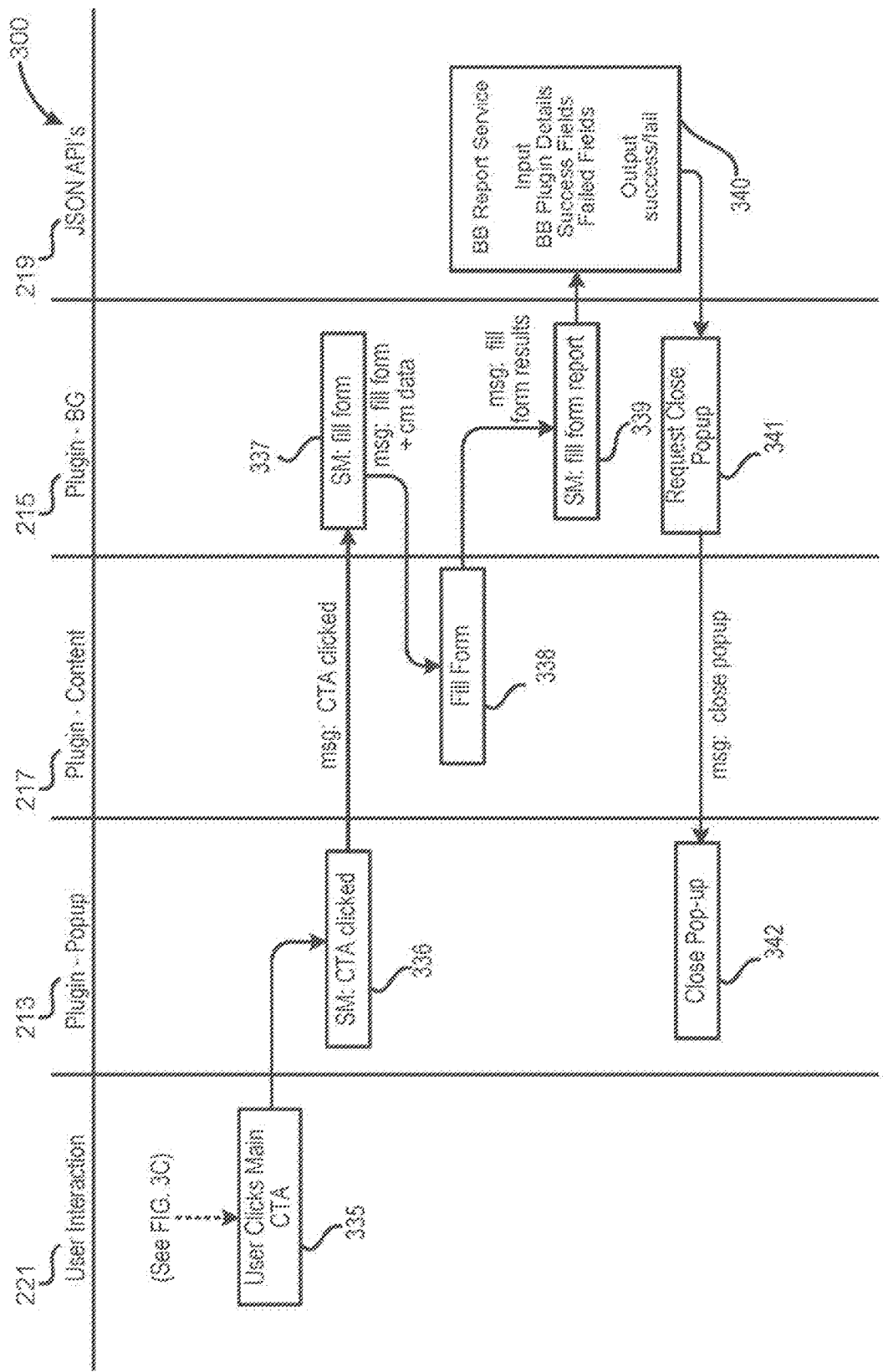

With reference to FIG. 2, the plug-in 207 may comprise various engines with different roles. The various engines may be in logical communication via a plug-in bus 214. A plug-in bus 214 may comprise a logical interconnection permitting communication among the engines. The plug-in bus 214 may be connected to a bus controller 216 which directs communication among the engines. More specifically, the plug-in 207 may comprise a pop-up engine 213, a background engine 215, a user interaction engine 221, a content engine 217, and a JSON API engine 219.

The user interaction engine 221 is configured to transmit and/or receive data to the user 201. The user interaction engine 221 thus may format data for human readability.

The pop-up engine 213 is configured to launch a pop-up window displaying various messages and/or receiving various inputs from users directly to the plug-in 207 without interfering with the content of the browser window 205 of the browser 203 that the user may be interested in viewing. In this manner, interaction with the browser plug-in 207 may be separated from interaction with the browser window 205, so that the user experience is improved.

The background engine 215 may be configured to perform background data processing and communication tasks, wherein the user interaction may be coordinated, for instance, autofilling of online forms.

The content engine 217 may be configured to populate content into an online form of a browser window 205 of a browser 203. For instance, the content engine 217 may fill data into an online form.

The JSON API engine 219 may be configured to communicate via a network with external resources, for instance a transaction account issuer 209 via a network 104.

With reference now to FIGS. 1-2 and 3A-3D, a method 300 of online purchase autofilling is disclosed. For instance, a user may start a web browser (step 301), which may include the user interacting with a user interaction engine 221 of a plug-in 207. The plug-in 207 may transmit a message to a background engine 215 directing the background engine 215 to initialize (step 302), whereupon the background engine 215 may retrieve a whitelist (step 303). A white list may comprise a list of websites approved for online purchase autofilling, and for which the transaction account issuer 209 has stored data representative of the nature and arrangement of fields of an online form of the website that is eligible for autofilling. The background engine 215 may communicate with a JSON API engine 219 which retrieves the whitelist from the transaction account issuer 209 via a network 104 (step 204). The background engine 215 may next retrieve fuzzy logic (step 305). The background engine 215 may communicate with the JSON API engine 219 which retrieves the fuzzy logic from the transaction account issuer 209 via a network 104 (step 306). The fuzzy logic may comprise a series of rules, wherein the plug in 207 may identify fields and determine the nature and arrangement of fields of an online form of a website that has never been encountered before, so that the plug-in 207 and/or transaction account issuer 209 may adapt to new online forms and autofill them according to machine learning principles. The background engine 215 may determine that the fuzzy logic comprises a new update, in which case various training of the user 201 may be desired. For instance, the pop-up engine 213 may display a tutorial page for a user 201 to review in order to educate the user 201 on how to leverage the fuzzy logic for autofilling (step 308).

In various embodiments, the user 201 may navigate to a URL in a browser window 205 of a browser 203 (step 309). The content engine 217 may inject a message receiver into the page (online form) associated with the URL in the browser window 205 of the browser 203, wherein the plug-in 207 may interact with the browser window 205 (step 310). The background engine 215 may return information regarding the fields present in the online form to a content engine 217 (step 311) which then confirms that the domain is not blacklisted (e.g., a "blacklist status") (step 312). In response to the domain being blacklisted (e.g., a blacklist status is "positive"), the plug-in 207 stops all operation. In response to the domain not being blacklisted (e.g., a blacklist status is "negative"), the content engine 217 of the plug-in 207 checks to see if the domain is whitelisted (e.g., a "white list status") (step 313). In response to the domain being not whitelisted (e.g., a whitelist status is "negative"), the content engine 217 scans the online form for fields by implementing fuzzy logic (step 320) and directs the background engine 215 to enable a pop-up window (step 321), which is enabled by the pop-up engine 213 (step 322).

In response to the domain being whitelisted, the background engine 215 requests domain information (step 314) from the JSON API engine 219 which communicates with the transaction account issuer 209 via a network 104 to obtain an exact map of fields in the online form (step 315). The exact map is returned to the background engine 215 which processes it to determine if it matches the exact map (step 316). In various embodiments, such processing includes directing the content engine 217 to further apply fuzzy logic (step 317), such as in the event that the online form does not match the exact match, so that the fuzzy logic is applied to identify new fields, and/or identify whether the domain is a new domain, such as a subdomain of the whitelisted domain (step 318). The background engine 215 may display a notification indicating the status of the processing steps (step 319) and the background engine 215 may enable a pop-up window (step 321), which then directs the pop-up engine 213 to enabled the display of the pop-up window (step 322).

The user 201 may continue on the online form, such as to desire that the form be autofilled. For instance, a user interaction engine 221 may receive a user click indicating that the user 201 wishes to launch the plug-in 207 and provide stored member information (step 323). The pop-up engine 213 receives the information (step 324) which is then leveraged by the background engine 215 (step 325) to determine whether a user session exists for this particular user 201 (step 326). In response to a user session existing, the user 201 may be permitted to proceed to utilize the online purchase autofilling functionality of the plug-in 207. For instance, the pop-up engine 213 may display a login form (step 331). The user 201 may enter a user name and password (step 327). First, the pop-up engine 213 may perform a validating step (step 328) configured to determine whether the user 201 is authorized to use the plug-in 207, and may then direct the JSON API engine 219 to interoperate with a transaction account issuer 209 via a network 104 to determine whether the user 201 is a transaction account holder (step 329). In response to the user 201 not being a transaction account holder, errors may be displayed by the pop-up engine 213 for the user 201 to view (step 330) and the process returns to step 331. In response to the user 201 being authenticated as a transaction account holder, the method may proceed to permitting the pop-up engine 213 to issue an instrument service call (step 332) to the JSON API engine 219 which then launches a instrument service configured to receive data from the plug-in 207 and return a list of transaction accounts and other stored member information (collectively, "responsive display data") for population into the online form (step 333). The pop-up engine 213 displays this responsive display data (step 332), thereafter, the user may select an account or instrument to be used for the transaction (step 335), via a click or keystroke received by the user interaction engine 221 (step 335).

Upon receipt of the keystroke, the pop-up engine 213 may send a message (step 226) to the background engine 215, directing the background engine 215 to fill an online form with the stored member information (step 337). The background engine 215 may direct the content engine 217 to populate the stored member information into the form within the browser window 205 of the browser 203 (step 228). The background engine 215 may return a report to the JSON API engine 219 detailing whether the form filling effort was successful, so that the transaction account issuer 209 may implement machine learning mechanisms to improve the form filling functionality (step 340). Thereafter, the background engine 215 may request that the pop-up engine 213 close the pop-up window with which the user had been interacting (step 341) and the pop-up window may be closed by the pop-up engine 213 (step 342).

Data, as discussed herein, may include "internal data." Internal data may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YouTube®, AppleTV®, Pandora®, xBox®, Sony® Playstation®), a uniform resource locator ("URL"), a document (e.g., a Microsoft Word® document, a Microsoft Excel® document, an Adobe .pdf document, etc.), an "ebook," an "emagazine," an application or microapplication (as described herein), an SMS or other type of text message, an email, Facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Examples of affiliate or partner websites include American Express®, Groupon®, LivingSocial®, and the like. Moreover, examples of mobile device communications include texting, email, and mobile applications for smartphones.

A "consumer profile," "customer data," or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT®, Windows 95/98/2000®, Windows XP®, Windows Vista®, Windows 7®, OS2, UNIX®, Linux®, Solaris®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, and optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, wherein shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

In various embodiments, components, modules, and/or engines of the system may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, pop-up windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A computer-implemented method, comprising:
   injecting, by a computing device, a message receiver into an electronic form comprising a plurality of fields;
   providing, by the computing device, a nature of the plurality of fields and an arrangement plurality of fields in the electronic form to the message receiver;
   validating, by the computing device, an identity of a transaction account holder;
   validating, by the computing device, a card security code associated with a transaction account of the transaction account holder;
   causing, by the computing device, the message receiver to populate a first field of the plurality of fields with the card security code; and
   causing, by the computing device, the message receiver to populate a second field of the plurality of fields with other information associated with the transaction account of the transaction account holder.

2. The computer-implemented method of claim 1, further comprising changing, by the computing device, a value of the card security code following a predefined period of time after a previous changing of the value of the card security code.

3. The computer-implemented method of claim 1, wherein the validating of the identity of the transaction account holder further comprises:
   analyzing, by the computing device, a token representing the transaction account; and
   determining, by the computing device, that the token corresponds to a transaction account number.

4. The computer-implemented method of claim 1, further comprising:
   issuing, by the computing device, an instrument service call to a JavaScript Object Notation (JSON) application programming interface (API) engine;
   receiving, by the computing device, the card security code and the other information corresponding to the transaction account holder from a transaction account issuer; and
   displaying, by the computing device, the card security code and the other information corresponding to the transaction account holder.

5. The computer-implemented method of claim 1, further comprising:
   retrieving, by the computing device, a list of approved websites comprising at least one website for which data representative of the nature of the plurality of fields and the arrangement of the plurality of fields is accessible; and
   determining, by the computing device, an approval status of a website associated with the electronic form based at least in part on the list of approved websites.

6. The computer-implemented method of claim 5, further comprising obtaining, by the computing device, domain information corresponding to the website in response to the approval status being positive, the domain information comprising the nature of the plurality of fields and the arrangement of the plurality of fields.

7. The computer-implemented method of claim 5, further comprising determining, by the computing device, the nature of the plurality of fields and the arrangement of the plurality of fields using a fuzzy logic comprising a series of rules.

8. A system, comprising:
   a computing device comprising a processor and a memory; and
   instructions stored in the memory that, when executed by the processor, cause the computing device to at least:
      inject a message receiver into an electronic form comprising a plurality of fields;
      provide a nature of the plurality of fields and an arrangement plurality of fields in the electronic form to the message receiver;
      validate an identity of a transaction account holder;
      validate a card security code associated with a transaction account of the transaction account holder;
      cause the message receiver to populate a first field of the plurality of fields with the card security code; and
      cause the message receiver to populate a second field of the plurality of fields with other information associated with the transaction account of the transaction account holder.

9. The system of claim 8, wherein the instructions, when executed by the processor, further cause the computing device to at least change a value of the card security code following a predefined period of time after a previous changing of the value of the card security code.

10. The system of claim 8, wherein the instructions that cause the computing device to validate the identity of the transaction account holder further cause the computing device to at least:
- analyze a token representing the transaction account; and
- determine that the token corresponds to a transaction account number.

11. The system of claim 8, wherein the instructions, when executed by the processor, further cause the computing device to at least:
- issue an instrument service call to a JavaScript Object Notation (JSON) application programming interface (API) engine;
- receive the card security code and the other information corresponding to the transaction account holder from a transaction account issuer; and
- display the card security code and the other information corresponding to the transaction account holder.

12. The system of claim 8 wherein the instructions, when executed by the processor, further cause the computing device to at least:
- retrieve a list of approved websites comprising at least one website for which data representative of the nature of the plurality of fields and the arrangement of the plurality of fields is accessible; and
- determine an approval status of a website associated with the electronic form based at least in part on the list of approved websites.

13. The system of claim 12, wherein the instructions, when executed by the processor, further cause the computing device to at least obtain domain information corresponding to the website in response to the approval status being positive, the domain information comprising the nature of the plurality of fields and the arrangement of the plurality of fields.

14. The system of claim 12, wherein the instructions, when executed by the processor, further cause the computing device to at least determine the nature of the plurality of fields and the arrangement of the plurality of fields using a fuzzy logic comprising a series of rules.

15. A non-transitory, computer-readable medium comprising machine-readable instructions stored in a memory that, when executed by a processor of a computing device, cause the computing device to at least:
- inject a message receiver into an electronic form comprising a plurality of fields;
- provide a nature of the plurality of fields and an arrangement plurality of fields in the electronic form to the message receiver;
- validate an identity of a transaction account holder;
- validate a card security code associated with a transaction account of the transaction account holder;
- cause the message receiver to populate a first field of the plurality of fields with the card security code; and
- cause the message receiver to populate a second field of the plurality of fields with other information associated with the transaction account of the transaction account holder.

16. The non-transitory, computer-readable medium of claim 15, wherein the machine-readable instructions, when executed by the processor, further cause the computing device to at least change a value of the card security code following a predefined period of time after a previous changing of the value of the card security code.

17. The non-transitory, computer-readable medium of claim 15, wherein the machine-readable instructions that cause the computing device to validate the identity of the transaction account holder further cause the computing device to at least:
- analyze a token representing the transaction account; and
- determine that the token corresponds to a transaction account number.

18. The non-transitory, computer-readable medium of claim 15, wherein the machine-readable instructions that cause the computing device to validate the identity of the transaction account holder further cause the computing device to at least:
- issue an instrument service call to a JavaScript Object Notation (JSON) application programming interface (API) engine;
- receive the card security code and the other information corresponding to the transaction account holder from a transaction account issuer; and
- display the card security code and the other information corresponding to the transaction account holder.

19. The non-transitory, computer-readable medium of claim 15, wherein the machine-readable instructions, when executed by the processor, further cause the computing device to at least:
- retrieve a list of approved websites comprising at least one website for which data representative of the nature of the plurality of fields and the arrangement of the plurality of fields is accessible; and
- determine an approval status of a website associated with the electronic form based at least in part on the list of approved websites.

20. The non-transitory, computer-readable medium of claim 19, wherein the machine-readable instructions, when executed by the processor, further cause the computing device to at least obtain domain information corresponding to the website in response to the approval status being positive, the domain information comprising the nature of the plurality of fields and the arrangement of the plurality of fields.

* * * * *